(12) United States Patent
Bouvet et al.

(10) Patent No.: US 12,375,443 B2
(45) Date of Patent: Jul. 29, 2025

(54) METHOD FOR PROCESSING DOMAIN NAME RESOLUTION REQUESTS

(71) Applicant: Orange, Issy-les-Moulineaux (FR)

(72) Inventors: Eric Bouvet, Chatillon (FR); Fabrice Fontaine, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 98 days.

(21) Appl. No.: 17/784,399

(22) PCT Filed: Nov. 30, 2020

(86) PCT No.: PCT/FR2020/052223
§ 371 (c)(1),
(2) Date: Jun. 10, 2022

(87) PCT Pub. No.: WO2021/116555
PCT Pub. Date: Jun. 17, 2021

(65) Prior Publication Data
US 2023/0023721 A1    Jan. 26, 2023

(30) Foreign Application Priority Data
Dec. 13, 2019   (FR) ...................................... 1914412

(51) Int. Cl.
*H04L 61/4511* (2022.01)
*H04L 9/40* (2022.01)

(52) U.S. Cl.
CPC ...... *H04L 61/4511* (2022.05); *H04L 63/0227* (2013.01); *H04L 63/0428* (2013.01)

(58) Field of Classification Search
CPC ............. H04L 61/4511; H04L 63/0227; H04L 63/0428

USPC ........................................................ 709/245
See application file for complete search history.

(56) References Cited

U.S. PATENT DOCUMENTS

| | | | | |
|---|---|---|---|---|
| 7,277,453 | B2* | 10/2007 | Chin | H04L 61/4511 370/395.5 |
| 8,526,405 | B2* | 9/2013 | Curtis | H04L 67/02 370/339 |
| 8,862,735 | B1* | 10/2014 | Singh | H04L 41/085 709/221 |
| 9,712,485 | B2* | 7/2017 | Droms | H04L 41/12 |
| 9,838,259 | B1* | 12/2017 | Earnhart | H04L 61/4511 |

(Continued)

OTHER PUBLICATIONS

RFC: 8484; DNS Queries over HTTPS (DoH) P. Hoffman, P. McManus pp. 1-20, Oct. 2018.*

(Continued)

*Primary Examiner* — Tauqir Hussain
(74) *Attorney, Agent, or Firm* — David D. Brush; Westman, Champlin & Koehler, P.A.

(57) ABSTRACT

A method for processing requests sent by a user terminal, carried out by an interface device allowing the user terminal to access a communication network. The method includes: when a received request is detected as intended for being transmitted to a server not authorized by the interface device, receiving a second request intended for being sent to a resolution server associated with the interface device among resolution servers associated with the interface device, and transmitting, to the resolution server associated with the interface device, the second request received or a third request generated by the interface device from the second request received.

13 Claims, 4 Drawing Sheets

(56) References Cited

U.S. PATENT DOCUMENTS

| | | | |
|---|---|---|---|
| 9,894,041 B2* | 2/2018 | Norum | H04L 63/0428 |
| 9,906,488 B2* | 2/2018 | Kagan | H04L 61/302 |
| 10,033,692 B1* | 7/2018 | Vavrusa | H04L 61/59 |
| 10,057,208 B2* | 8/2018 | Droms | H04L 61/4511 |
| 10,404,827 B2* | 9/2019 | Evens | H04L 67/51 |
| 10,601,775 B1* | 3/2020 | Xie | H04L 63/1408 |
| 10,798,134 B2* | 10/2020 | Sinha | H04L 65/1104 |
| 10,872,016 B2* | 12/2020 | Heckel | H04L 63/0281 |
| 10,979,403 B1* | 4/2021 | Mutescu | H04L 9/0631 |
| 11,109,310 B1* | 8/2021 | Crespi | H04W 48/20 |
| 11,159,498 B1* | 10/2021 | Casu | H04L 9/0825 |
| 11,368,535 B2* | 6/2022 | Prodoehl | H04L 69/18 |
| 11,829,345 B2* | 11/2023 | Gentric | G06F 16/2365 |
| 2005/0267978 A1* | 12/2005 | Satapati | H04L 61/2585 709/230 |
| 2010/0100957 A1* | 4/2010 | Graham | G06Q 10/107 726/22 |
| 2011/0292857 A1* | 12/2011 | Sarikaya | H04L 69/167 370/312 |
| 2012/0173677 A1* | 7/2012 | Richardson | H04L 61/301 709/219 |
| 2013/0201999 A1* | 8/2013 | Savolainen | H04L 61/251 370/467 |
| 2016/0149913 A1* | 5/2016 | Eriksson | G06F 21/6218 726/6 |
| 2016/0255012 A1* | 9/2016 | Mizrachi | H04L 63/101 370/230 |
| 2016/0344688 A1* | 11/2016 | Lakhera | H04L 61/4511 |
| 2016/0373479 A1* | 12/2016 | Akcin | H04L 61/5007 |
| 2017/0230373 A1* | 8/2017 | Kadur | H04L 67/02 |
| 2019/0005474 A1* | 1/2019 | Cady | G06Q 40/02 |
| 2019/0297655 A1* | 9/2019 | Garneij | H04L 61/5007 |
| 2019/0334869 A1* | 10/2019 | Grant | H04L 63/0823 |
| 2020/0274868 A1* | 8/2020 | Passaglia | H04L 63/166 |
| 2021/0029074 A1* | 1/2021 | Buck | H04L 63/0407 |
| 2022/0311734 A1* | 9/2022 | Boucadair | H04L 61/4511 |
| 2022/0353233 A1* | 11/2022 | Helfinstine | H04L 61/4511 |
| 2023/0083671 A1* | 3/2023 | Qu | H04L 61/4511 709/245 |
| 2023/0328071 A1* | 10/2023 | Chen | H04L 63/101 726/4 |
| 2023/0412563 A1* | 12/2023 | Barnett | H04L 61/4511 |

OTHER PUBLICATIONS

Hoffman P. et al., "DNS Queries Over HTTPS (DoH)" RFC 8484, IETF, Oct. 19, 2018 (Oct. 19, 2018), XP015128219.

International Search Report dated Jan. 12, 2021 for corresponding International Application No. PCT/ FR2020/052223, Nov. 30, 2020.

Written Opinion of the International Searching Authority dated Jan. 12, 2021 for corresponding International Application No. PCT/FR2020/052223, filed Nov. 30, 2020.

English translation of the Written Opinion of the International Searching Authority dated Jan. 21, 2021 for corresponding International Application No. PCT/FR2020/052223, filed Nov. 30, 2020.

* cited by examiner

METHOD FOR PROCESSING DOMAIN NAME RESOLUTION REQUESTS

CROSS-REFERENCE TO RELATED APPLICATIONS

This Application is a Section 371 National Stage Application of International Application No. PCT/FR2020/052223, filed Nov. 30, 2020, which is incorporated by reference in its entirety and published as WO 2021/116555 A1 on Jun. 17, 2021, not in English.

FIELD OF THE DISCLOSURE

The present invention relates to a method for processing requests, in particular domain name resolution requests.

It also relates to an interface device, such as a home gateway, implementing the processing method according to the invention.

BACKGROUND OF THE DISCLOSURE

Conventionally, when a client device connected to a communication network addresses a domain name resolution request to a domain name resolution server or DNS (for "Domain Name System") server, it uses the UDP (for "User Datagram Protocol") protocol. These domain name resolution requests are sent unencrypted and may be intercepted and/or manipulated by third parties.

Nowadays, in order to improve the security and confidentiality of communication network users, domain name resolution requests are often addressed to DNS servers using secure protocols, such as HTTPS (for "HyperText Transfer Protocol Secure"). The HTTPS protocol corresponds to the HTTP protocol combined with a protocol for securing client-server exchanges, such as TLS (for "Transport Layer Security") or SSL (for "Secure Sockets Layer"), the HTTPS protocol making it possible to encrypt domain name resolution requests so as to avoid eavesdropping and/or manipulation of the requests by third parties.

Using the HTTPS protocol to implement domain name resolutions is known as DNS over HTTPS (DoH).

Access providers providing access to a communication network such as the Internet (IAP) use the domain name resolution requests sent by the terminals of their users or subscribers for tasks intended to protect the subscribers or users. Filtering operations are thus implemented by Internet access providers, for example in order to enforce laws by detecting illegal sites, to allow parental controls to be implemented, and to detect malicious behavior such as the hijacking of domain name resolution requests or fraudulent domain name resolutions. Furthermore, domain name resolution requests are used by Internet access providers to implement other operations, such as load distribution on the communication network.

To implement the abovementioned operations, Internet access providers direct domain name resolution requests sent by the terminals of their users to what are known as "trusted" DNS servers. In particular, when a user terminal of a subscriber to an access provider sends a domain name resolution request, a home gateway connecting the user terminal to the Internet access provider transmits the resolution request to DNS servers associated therewith. The DNS servers associated with the home gateway may be local DNS servers, that is to say belonging to the Internet access provider, or DNS servers not belonging thereto but being DNS servers considered to be trusted by the Internet access provider.

It should be noted that the home gateway of an Internet access provider may transmit resolution requests to associated DNS servers using the HTTP protocol (requests sent unencrypted) or the HTTPS protocol (requests sent in encrypted form).

Nowadays, some web browsers installed on user terminals use secure protocols, such as the DNS over HTTPS protocol, to perform domain name resolutions. In this case, the resolution requests are sent directly to DNS servers supporting this protocol and associated with the browsers, without the Internet access provider having access to the resolution requests.

As a result, some of the resolution requests sent by user terminals are not sent to the DNS servers associated with the home gateway, Internet access providers not being able to use the resolution requests for tasks such as law enforcement, detecting malicious behavior or controlling the load of the communication network.

SUMMARY

The present invention aims to allow Internet access providers to control the processing of all domain name resolution requests, even if the DNS over HTTPS protocol (or other secure protocol) is used for the domain name resolutions, while still guaranteeing user confidentiality and security.

To this end, the invention relates, according to a first aspect, to a method for processing requests sent by a user terminal, the method being implemented by an interface device allowing the user terminal to access a communication network.

According to the invention, when a received request, called first request, is detected as being intended to be transmitted to a server not authorized by the interface device, the processing method comprises:
  receiving a second request intended to be sent to a resolution server associated with the interface device from among resolution servers associated with the interface device; and
  transmitting, to the resolution server associated with the interface device, the received second request or a third request generated by the interface device based on the second request.

By virtue of the features of the method, when the interface device detects that a request will be transmitted to a server not authorized by the access provider providing access to the communication network, such as the Internet, it transfers it to one of the authorized resolution servers.

It should be noted that the servers authorized and not authorized by the communication network access provider are entered in the interface device. A server not authorized by the interface device is thus a server not authorized by the communication network access provider. In other words, since the interface device is configured according to the operating rules of the communication network access provider, it is configured so as to recognize authorized servers and unauthorized servers.

In practice, the first request and the second request are received by the interface device from the user terminal.

The request sent by the user terminal, in particular by a web browser installed on the user terminal, may be a domain name resolution request. The interface device is typically a home gateway.

It is considered that a resolution server associated with the interface device is a resolution server authorized by the communication network access provider. The resolution server associated with the interface device is a resolution server from among a set of resolution servers associated with the interface device.

By virtue of the invention, when the interface device detects that a first request has been generated to be sent to an unauthorized server, a second request is generated by the user terminal, this second request being intended to be sent to a resolution server associated with the interface device or resolution server authorized by the communication network access provider.

Therefore, when the user terminal, in particular the web browser installed on the terminal, attempts to direct a resolution request to an unauthorized resolution server, the interface device processes this request either by returning it to an authorized resolution server or by generating a third request based on the second request and by then sending this third request to an authorized resolution server.

In practice, an unauthorized server is a server different from the resolution servers associated with the interface device and/or a server forming part of what is termed a list of servers not authorized by the access provider providing access to said communication network.

Thus, according to some embodiments, it may be checked whether the server to which a request will be addressed corresponds to a server associated with the interface device, whether the server forms part of a list of unauthorized servers, or both.

According to one embodiment, a request intended to be transmitted to an unauthorized server corresponds to a request intended to be transmitted to a server different from the resolution servers associated with the interface device.

In other words, in this embodiment, when the interface device detects that a request is intended to be addressed to a resolution server different from the resolution servers associated therewith, a second request is generated, this second request being intended to be sent to one of the resolution servers associated therewith.

According to another embodiment, a request intended to be transmitted to an unauthorized server corresponds to a request intended to be transmitted to a server forming part of what is termed a list of servers not authorized by the access provider providing access to said communication network.

In this embodiment, when the interface device detects that a request is intended to be addressed to a server belonging to the list of unauthorized resolution servers, a second request is generated by the user terminal, this second request being intended to be sent via the interface device to a resolution server associated with the interface device.

According to yet another embodiment, a request intended to be transmitted to an unauthorized server corresponds to a request intended to be transmitted to a server different from the resolution servers associated with said interface device, this server forming part of what is termed the list of unauthorized servers.

Thus, according to some embodiments, the interface device may have associated with it either one or more lists listing the authorized resolution servers, or one or more lists listing the unauthorized resolution servers, or one or more lists listing the authorized resolution servers along with one or more lists listing the unauthorized resolution servers.

The resolution servers associated with the interface device belong to a set of servers comprising resolution servers belonging to the access provider providing access to the communication network, such as the Internet, along with resolution servers external to the communication network access provider but considered to be trusted resolution servers. These servers are resolution servers authorized by the interface device, that is to say by the communication network access provider.

On the contrary, a resolution server not authorized by the interface device or by the communication network access provider is a resolution server not belonging to this set of resolution servers.

Furthermore, as indicated above, the unauthorized resolution servers may be listed in what is termed the list of unauthorized servers.

According to one feature, the processing method comprises:
  determining, based on the received request, a network address representative of the server to which the request is destined; and
  checking the determined network address in order to determine whether the determined address corresponds to a server not authorized by the interface device.

A request intended to be sent to an unauthorized server is thus detected based on the determined network address. This address may be an "Internet-Protocol" address, known as "IP address".

According to one embodiment, during the check, it is checked whether the determined network address corresponds to a server associated with the interface device. If the address does not correspond to an address of a server associated with the interface device, the determined network address corresponds to an unauthorized server.

According to another embodiment, during the check, it is checked whether the determined network address corresponds to a server in what is termed the list of unauthorized servers. If so, the determined address corresponds to an unauthorized server.

According to one feature, the processing method comprises determining, based on the received request, a port of the interface device designated for the destination of said received request, and if the determined port corresponds to a port for establishing a secure connection, the method furthermore comprises:
  determining, based on the received first request, a network address representative of the server to which the first request is destined, and
  checking the determined network address in order to determine whether the determined network address corresponds to a server not authorized by the interface device.

According to this embodiment, when it is detected that the port designated for the destination of the request is a port for establishing a secure connection, the interface device, suspecting the sending of an encrypted request, checks the network address representative of the server in order to check whether the server to which the request is destined is an authorized server.

It should be noted that the communication network access provider allows secure communications to be established with authorized servers. This makes it possible to further improve user confidentiality and security.

According to one feature, if the determined port corresponds to a port for establishing a secure connection and the network address does not correspond to a server associated with the interface device or to a network address of a server in the list of unauthorized servers, the method furthermore comprises:

generating an encrypted test request intended to be sent to the server corresponding to the determined network address;

sending the test request to said determined port; and if the interface device receives a response to the test request from the server, identifying said server as being an unauthorized server.

In this embodiment, if a port for establishing a secure connection is used and the address does not correspond to a server authorized by the communication network access provider, the interface device sends a test request in order to check whether the server to which the request is destined is a resolution server that understands encrypted requests, that is to say a resolution server supporting secure protocols such as the DNS over HTTPS protocol. If the resolution server understands the encrypted requests, it responds to the interface device in response to the test request.

Since the interface device receives a response from the resolution server, it identifies the server as being an unauthorized server. This server may be contained in what is termed a list of unauthorized servers, this list possibly already existing or being created with the inclusion of the identified server.

According to one feature, the test request is generated by the interface device.

According to one feature, the processing method furthermore comprises:

receiving, from the user terminal, an unencrypted resolution request comprising a predefined character string; and sending, to the user terminal, a response representative of an error telling the user terminal not to generate encrypted requests, a second request intended to be sent to a server associated with the interface device being received following the sending of said response representative of an error.

For example, the predefined character string is "use-application-dns.net".

The error message tells the user terminal that it should not encrypt resolution requests and that it should not send encrypted resolution requests to unauthorized servers. In other words, the user terminal is informed, by the message from the user device, of the need to use the unencrypted resolution mechanism (DNS resolution) and not to send encrypted resolution requests to unauthorized servers.

By virtue of these features of the method, the option for the user terminal to generate encrypted requests to servers not authorized by the communication network access provider is deactivated. In other words, once the user terminal receives this response from the interface device, the generated requests (such as the second request) are intended to be addressed to a server associated with the interface device, these resolution requests being unencrypted.

According to some embodiments, the second request may be transmitted in unencrypted form to the server associated with the interface device, or it may be encrypted before being sent to the server associated with the interface device.

According to one embodiment, when the received request is detected as being intended to be transmitted to a server not authorized by the interface device, the method comprises blocking the transmission of said received request, said reception of a second request being implemented following the implementation of said blocking of the transmission of said received request.

In other words, the blocking of the sending of the received request triggers the generation (by the user terminal) of a second request, this request being destined for a server associated with the interface device, that is to say for an authorized server.

According to another embodiment, when the received request is detected as being intended to be transmitted to a server not authorized by the interface device, said method comprises configuring the user terminal such that the received second request is intended to be transmitted to said server associated with the interface device.

Thus, in the event of detection of a request destined for an unauthorized server, the transmission of the request is blocked and the user terminal, in particular the browser installed on the user terminal, is configured so as to generate requests to a resolution server associated with the interface device. The requests subsequently generated by the user terminal are thus generated to the server associated with the interface device.

According to one feature, the processing method furthermore comprises generating an error message destined for the user terminal, informing said user of the detection of a request intended to be transmitted to a server not authorized by the Internet access provider.

The user is thus informed that his terminal, in particular the browser installed on the terminal, is attempting to access servers not authorized by his access provider providing access to the communication network, such as the Internet.

According to one feature, the second request is encrypted by the user device.

According to another embodiment, the second request is not encrypted by the user device. It may then be encrypted by the interface device before sending.

The second request may thus be addressed to the server associated with the interface device using a secure or non-secure connection.

According to one feature, the third request generated based on said second request is destined for a resolution server from among a predefined subgroup of servers associated with the interface device or corresponds to the encrypted second request.

The choice of servers to which the second request may be addressed is thus restricted.

By virtue of these features, the security of the connections to the communication network is increased, by implementing filters such as "parental control" filters.

According to a second aspect, the invention relates to an interface device allowing a user terminal to access a communication network.

According to the invention, the interface device comprises the following means for processing requests sent by said user terminal:

a reception module configured so as to receive a first request received from the user terminal:

a detection module configured so as to detect whether the received request is intended to be transmitted to a server not authorized by the access provider; and a transmission module configured so as to transmit, to a resolution server associated with said interface device, a second request received from the user terminal by said reception module or a third request generated by the interface device based on the second request, said second request being intended to be sent to said resolution server associated with said interface device.

The interface device has at least one associated resolution server to which the resolution requests from the user terminal are addressed. When the interface device detects that a request received from the terminal is intended to be sent to a resolution server that is not authorized by the communication network access provider. The interface device is configured so as to detect whether a resolution request is intended to be transmitted to a server different from said at least one associated server.

According to some embodiments, the interface device is furthermore configured so as to generate a third request based on the received second request. This third request may be generated by applying filters to the second request or by encrypting the second request.

According to one feature, the interface device comprises the associated resolution server.

According to a third aspect, the invention relates to a request processing system comprising a user terminal configured so as to access a communication network and an interface device according to the invention, allowing the user terminal to access the communication network.

According to a fourth aspect, the invention relates to a computer program comprising a sequence of instructions for implementing the processing method according to the invention when it is loaded and executed by a processor.

According to a fourth aspect, the invention relates to a computer-readable information medium on which there is recorded a computer program comprising a sequence of instructions for implementing the processing method according to the invention when it is loaded into and executed by a processor.

The interface device, the request processing system, the computer program and the information medium have features and advantages analogous to those described above in relation to the processing method.

BRIEF DESCRIPTION OF THE DRAWINGS

Other particular features and advantages of the invention will become more clearly apparent in the following description.

In the appended drawings, which are given by way of non-limiting examples.

DETAILED DESCRIPTION OF ILLUSTRATIVE EMBODIMENTS

Figure 1:
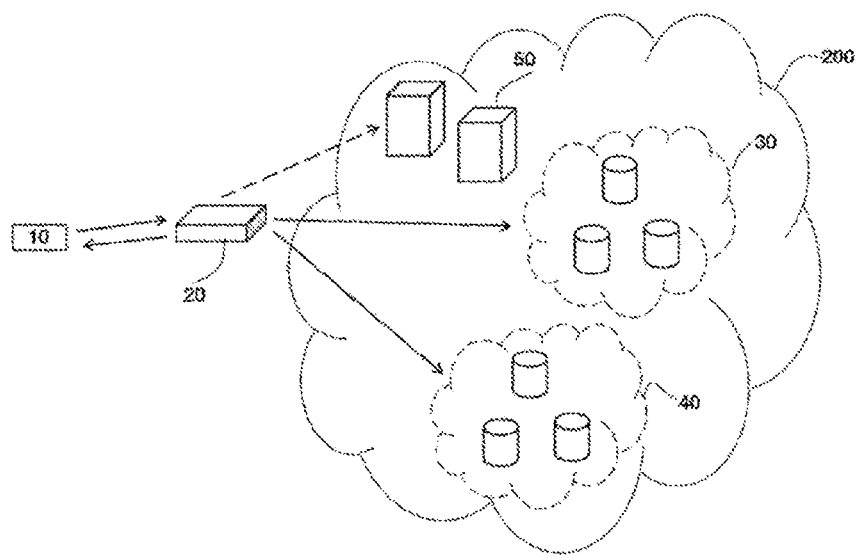
FIG. 1 shows a diagram illustrating the context of the invention.

FIG. 1 shows a user device 10 able to access a communication network 200 via an interface device 20. The communication network 200 may be the Internet and the interface device 20 may be a home gateway or a router allowing the user terminal 10 to access the Internet. Access to the communication network is provided by a communication network access provider.

The user terminal 10 may be any type of device configured so as to access a communication network such as the Internet via the home gateway 20. The terminal 10 may be a cell phone or other mobile communication terminal, such as a tablet or a laptop computer, a desktop computer, or a domestic appliance able to establish a connection with the communication network 200.

When a user enters a domain name into the browser installed on his terminal 10, a domain name resolution request is sent by the terminal to a resolution server or DNS server 30, 40, 50. The DNS server responds to the terminal 10 with a network address or "Internet Protocol" address corresponding to the domain name, the terminal 10 then being able to access the IP address via the home gateway 20.

The home gateway 20 is an interface device allowing exchanges between the user terminal 10 and the communication network 200. It takes responsibility, inter alia, for addressing resolution requests RR to resolution servers 30, 40, 50. One possible architecture of the interface device will be described later with reference to FIG. 4.

In general, the resolution requests are addressed to local resolution servers 30 belonging to the communication network access provider or to resolution servers 40 not belonging to the communication network access provider but considered to be trusted by the communication network access provider. It will be considered that a server associated with the interface device 20 is either a local resolution server 30 or a trusted server 40.

Furthermore, as indicated above, the resolution requests are sometimes addressed to external resolution servers 50 to which the communication network access provider does not have access, these servers supporting secure protocols such as DoH.

The interface device 20 is configured so as to determine whether a resolution server is authorized or not authorized by the access provider providing access to the communication network to which it allows access. Furthermore, the user terminal 10 is configured at least so as to generate requests to at least one resolution server 30, 40 associated with the interface device 20.

By virtue of the processing method proposed by the invention, the sending of encrypted requests to external servers 50 is detected and then processed. This processing method is described below.

Figure 2:
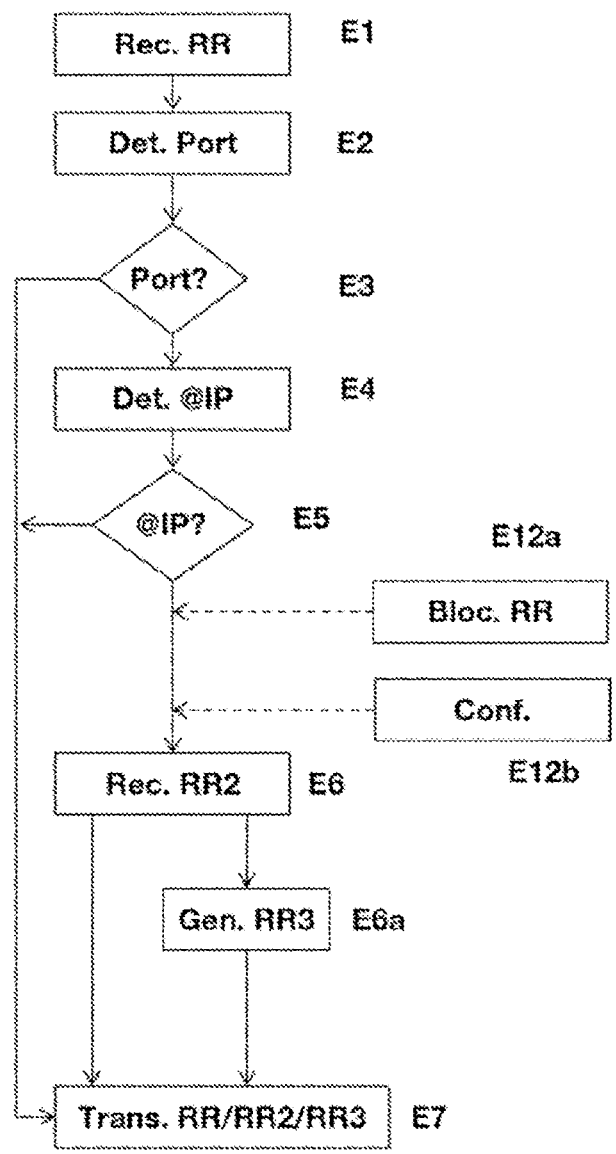
FIG. 2 illustrates steps of a request processing method according to a first embodiment of the invention.

FIG. 2 illustrates a flowchart of the processing method according to a first embodiment of the invention.

When the user wishes to access the communication network 200 via the interface device 20, his terminal 10 generates a domain name resolution request RR, called first request, to resolve the domain name he wishes to access, and sends it to the interface device 20.

According to one embodiment, such as the one shown in FIG. 2, when the interface device 20 receives E1 a request (first request), such as a resolution request, from the user terminal 10, it determines E2, based on the received request RR, the destination port for said request RR.

The identification of the destination port for the request gives an indication of the protocol used for the domain resolution and makes it possible to determine whether or not the connection that will be established with the resolution server 30, 40, 50 will be a secure connection. The identification of the destination port thus makes it possible to determine whether the resolution request addressed to the resolution server 20, 30, 40 is encrypted or not.

For example, if the destination port used in the request is port 443, the request is encrypted and the connection that will be established with the resolution server 30, 40, 50 will be secure.

It should be noted that, if the server with which the user terminal 10 will establish a connection is a trusted server 30, 40, it is advantageous to use a secure connection to software port 443. Nevertheless, this software port may also be used to address encrypted requests to servers 50 that are not trusted.

Thus, according to one embodiment, it is checked E3 whether the determined port corresponds to a port for establishing a secure connection. When said determined port corresponds to a port for establishing a secure connection, the processing method comprises determining E4 a network address representative of the server 30, 40, 50 to which the request RR is destined. This network address is determined E4 based on the received request RR.

Next, the determined network address is checked E5 in order to determine whether it corresponds to an authorized or unauthorized server 30, 40, 50.

According to some embodiments, an unauthorized server may be a server different from the resolution servers 30 associated with the interface device 20 and/or a server 50 forming part of what is termed a list of servers not authorized by the access provider providing access to said communication network 200.

The checking step E5 may therefore be implemented according to various embodiments.

According to one embodiment, the interface device 20 has a set of associated servers 20, 30, access to these associated servers being authorized. The interface device 20 thus comprises a storage module or what is termed a list of associated servers 20, 30 or authorized servers 20, 30.

The list of associated servers 20, 30 contains the network addresses of the servers 30 belonging to the communication network access provider. It may furthermore contain servers not belonging to the communication network access provider but being trusted servers 40. This type of list is known as a "whitelist" of servers.

In this embodiment, during the checking E5 of the network address, it is checked whether the address belongs to this list of associated servers.

If the address belongs to the list of associated servers, the received request is transmitted E7 to the resolution server 30, 40.

If, during the checking E5 of the network address, it is determined that the address does not belong to the list of associated servers, the interface device does not transmit the request to the resolution server 50.

It should be noted that, since the destination port identified in the request is a port for establishing a secure connection, and that, since the network address of the resolution server is a server not in the list of associated servers 30, 40, it is determined that the request is encrypted and that it is intended to be transmitted to a server 50 not authorized by the communication network 200 access provider.

According to a second embodiment, the interface device 20 stores what is termed a list of unauthorized servers 50.

This list of servers includes network addresses of unauthorized servers 50. These servers are typically servers supporting secure protocols such as the DoH protocol, not belonging to the communication network access provider and not being one of the servers considered to be trusted servers by the communication network access provider. This type of list is known as a "blacklist" of servers.

In this embodiment, during the checking E5 of the network address, it is checked whether the address belongs to this blacklist of servers.

If the address does not belong to the blacklist of servers, the received request is transmitted E7 to the resolution server 30, 40. It should be noted that it is deduced that, if the server is not listed in the "blacklist" of servers, the server is either a server belonging to the access provider or considered to be trusted by the access provider. In other words, it may be considered that the server is a server associated with the interface device 20.

If, during the checking E5 of the network address, it is determined that the network address belongs to the blacklist of servers, the interface device does not transmit the request to the resolution server 50.

It should be noted that, since the destination port identified in the request is a port for establishing a secure connection, it is suspected that the user terminal 10 will establish a connection with an unauthorized server 50. The suspicion is confirmed through the identification of the network address in the blacklist of servers.

According to a third embodiment, during the checking E5, the whitelist of servers and the blacklist of servers may be used. For example, if the network address does not correspond to any server in the whitelist of servers, it is checked whether it corresponds to one of the servers in the blacklist of servers, and vice versa.

When, at the end of the checking step E5, a request RR received E1 from the user terminal 10 is detected as being intended to be transmitted to a server 50 not authorized by an access provider providing access to said communication network 200, the user terminal 10 generates a second request RR2, this second request being intended to be sent to a resolution server 30 associated with the interface device 20.

It should be noted that a request RR intended to be transmitted to an unauthorized server 50 may be generated by the browser installed on the user terminal 10. This browser may be configured by the browser provider such that it uses a server operating in accordance with the DoH protocol belonging to the browser provider.

The generated second request RR2 is destined for a server 30 associated with the interface device 20, such as a DNS server provided by the interface device 20 to the user during DHCP exchanges. According to one embodiment, once the second request RR2 has been received E6 by the interface device 10, the second request RR2 is transmitted to a resolution server 30 associated with the interface device 20.

According to other embodiments, a third request RR3 is generated E6a by the interface device based on the second request RR2.

For example, if the second request RR2 is not encrypted, encryption operations may be applied to the second request when it is generated E6a. The third request RR3 thus corresponds to the encrypted second request RR2.

According to another example, filters may be applied to the second request RR2, the filtering making it possible to protect the privacy of the user or to apply parental control filters. The third request RR3 is then transmitted to a resolution server 30 associated with said interface device 20.

Privacy protection filters and parental control are known to those skilled in the art and do not need to be described here.

The triggering of the generation of the second request RR2 by the user terminal will be described later.

According to some embodiments, the second request RR2 may be encrypted or unencrypted, in other words addressed to the server associated with the interface device 20 using a secure or non-secure connection, respectively.

For this purpose, the user terminal 10 and/or the interface device 20 may be configured so as to allow encrypted or unencrypted connections.

According to one embodiment, the second request may be destined for a resolution server from among a subgroup of servers 30, 40 associated with the interface device 20.

This makes it possible to increase the security of the connections to the communication network 200 by implementing filters such as "parental control" filters.

Figure 3:
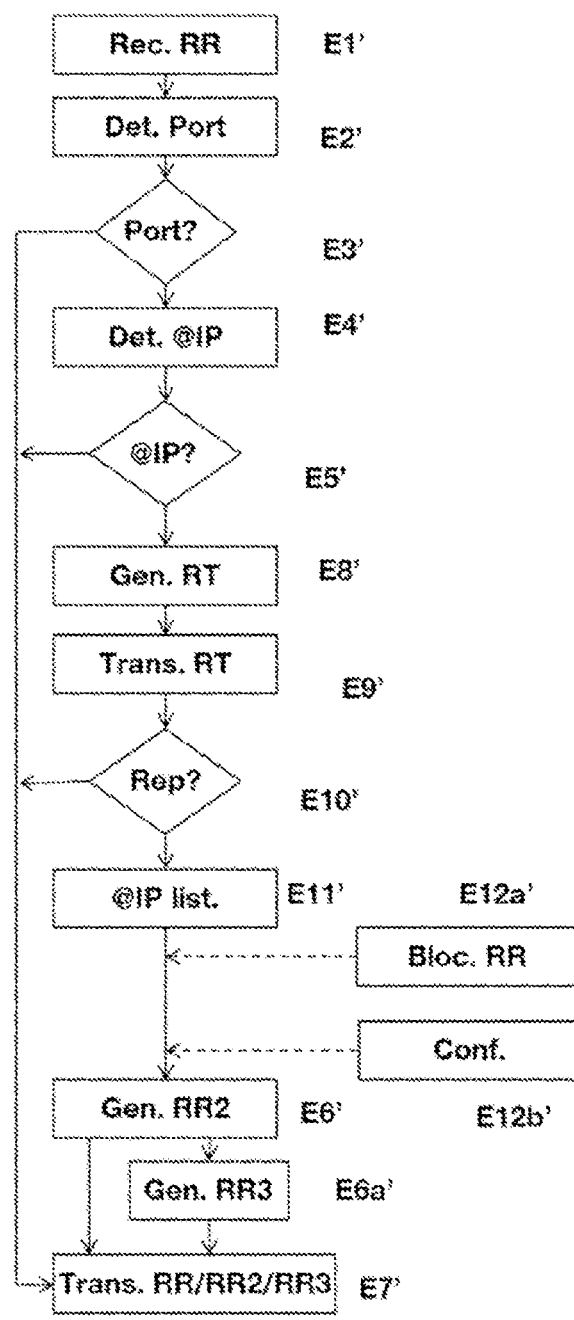
FIG. 3 illustrates steps of a request processing method according to a second embodiment of the invention.

FIG. 3 illustrates a flowchart of the processing method according to the invention, according to a second embodiment.

Steps E1' to E5' are similar to steps E1 to E5, respectively described with reference to FIG. 1.

In the embodiment illustrated in FIG. 3, when it is detected that the request received by the interface device 20 is intended to be transmitted via a port for establishing a secure connection, such as software port 443, and that the network address contained in the request is representative of an unauthorized server, the interface device 20 generates E8' a test request RT intended to be sent to the server corresponding to the determined network address E4'. This test request RT is encrypted and is understood only by servers supporting secure protocols such as the DoH protocol.

It should be noted that, in the same way as the embodiment described with reference to FIG. 2, the checking of the network address E5' in order to determine whether it corresponds to an unauthorized server may be implemented according to the various embodiments described below.

In the embodiment described now, the generated test request RT is transmitted E9' to the previously determined E2' secure port, to the server represented by the previously determined E4' network address.

Since the test request is encrypted, the server receiving the test request RT understands this request RT only if it supports a secure protocol. If the server understands the request, it responds to the interface device 20.

It should be noted that, as is known to those skilled in the art, the request encryption parameters are chosen in accordance with the standard TLS (for "Transport Layer Security") protocol, this protocol defining how a client device (user terminal) and a server should synchronize on the choice of an encryption algorithm understood by both parties. Next, in this encrypted channel, the interface device 20 sends a request generated in accordance with a secure protocol, such as the DoH protocol, to resolve a domain name, for example "orange.fr".

The interface device 20 receiving E10' a response from the server identifies E11' the server as being an unauthorized server.

The interface device 10 thus includes the server, in particular the network address representative of the identified server, in a list of unauthorized servers. In one embodiment, this list of unauthorized servers or blacklist of servers exists beforehand (for example, it is stored in the interface device), the network address of the identified server being added to the list. In another embodiment, the list of unauthorized servers does not exist. The blacklist of servers is thus created following the identification of this server.

Thus, each time the user terminal 10 attempts to access an unauthorized server 50, the unauthorized server is identified and listed in a blacklist. The subsequently generated requests intended to be transmitted to this server 50 are therefore detected quickly. This phase (E8' to E11') is considered to be a learning phase.

Next, according to one embodiment, the user terminal 10 generates a second request RR2, this second request being intended to be sent to a resolution server 30 associated with the interface device 20. Once the second request RR2 has been received E6' by the interface device 10, the second request RR2 may be transmitted E7' to a resolution server 30 associated with the interface device 20 or, as indicated below for another embodiment, various filtering operations may be implemented, a third request RR3 being generated E6a' based on the second request RR2. In this case, the third request is transmitted E7' to the resolution server 30 associated with the interface device 20.

The generation E6, E6' of a second request RR2 by the user terminal 10 may be triggered according to various embodiments.

According to a first embodiment, when a request received E1, E1' from the user terminal 10 is detected as being intended to be transmitted to an unauthorized server (not to E5 or E5'), transmission thereof is blocked E12a, E12a' by the interface device 20.

According to one embodiment, the user device 10 may be notified, via a communication channel other than the one established with the interface device, of the blocking of the request by the interface device 20.

According to another embodiment, the user device 10 understands that the request has been blocked by the interface device 20 if, after a period of time, it has not received a response from the resolution server, that is to say if the domain name has not been resolved.

By way of completely non-limiting example, the period of time is of the order of 30 seconds.

The second request RR2 is generated following the blocking E12a, E12a' of the transmission of the received request.

According to a second embodiment, when a request received E1, E1' from the user terminal 10 is detected as being intended to be transmitted to an unauthorized server (response "no" in E5 or E5'), the user terminal is configured such that, when the second request is generated, it is intended to be transmitted to a server 30 associated with the interface device. The network address of the server 30 associated with the interface device is thus contained in the generated second request.

In one embodiment, the user terminal 10 is configured by way of a configuration protocol such as the DHCP (for "Dynamic Host Configuration Protocol") protocol. This type of protocol makes it possible to configure the network parameters of the user terminal, in particular to allocate the network address of the server to which the requests generated for establishing a connection with the communication network are addressed.

This type of configuration is known to those skilled in the art and does not need to be described in more detail here.

It should be noted that the requests generated following the configuration E12b, E12b' will be intended to be transmitted to the server 30 associated with the interface device 20. For this purpose, the network address of the server will be contained in the requests generated later.

According to one embodiment, when a request intended to be transmitted to a server not authorized by the Internet access provider is detected (at the end of E5, E5'), an error message destined for the user terminal 10 is generated, this error message informing the user of said detection. The user is thus notified that the browser he is using is attempting to access a server not authorized by his communication network access provider.

According to one embodiment, the user is notified of said detection via other terminals belonging to him. Thus, if a third party uses a terminal of the user and attempts to access an unauthorized server, the user is made aware.

Figure 4:
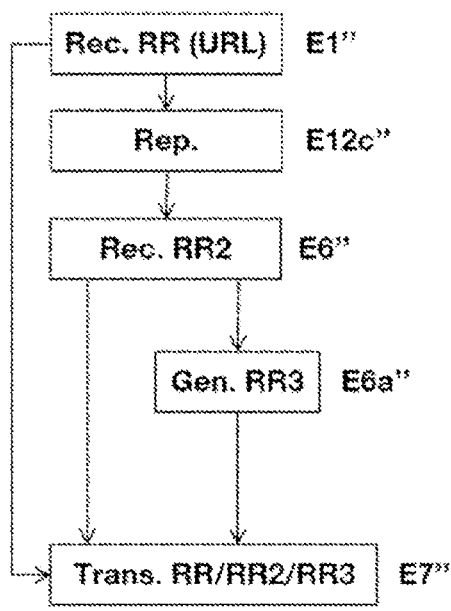
FIG. 4 illustrates steps of a request processing method according to a third embodiment of the invention.

FIG. 4 illustrates steps of a third embodiment of the invention.

In this embodiment, the interface device receives E1" a request from the user terminal 10, this request being an unencrypted resolution request comprising a predefined character string.

For example, the predefined character string identifies a resource such as "use-application-dns.net". The predefined character string is known as a URL (for "Uniform Resource Locator").

The interface device detecting E1a" this predefined character string sends E12c" a response representative of an error to the user terminal 10.

Through this response representative of an error, the interface device 20 asks the user terminal 10 not to encrypt resolution requests and not to send encrypted resolution requests to unauthorized servers 50.

In other words, the user terminal 10 is informed, by the message from the user device 20, of the need to use the unencrypted resolution mechanism (DNS resolution) and not to send encrypted resolution requests to unauthorized servers 50.

The user terminal 10 receiving this message from the interface device 20 generates E6", as in the previous embodiments, a second request RR2 intended to be sent to a server 30, 40 associated with the interface device 20.

By virtue of these features, the option for the user terminal 10 to generate encrypted requests to servers 50 not authorized by the communication network 200 access provider is deactivated. In other words, once the user terminal 10 receives this response from the interface device 20, the generated requests (such as the second request RR2) are intended to be addressed to a server 30, 40 associated with the interface device 20, these resolution requests being unencrypted.

Next, according to some embodiments, the second request RR2 may be transmitted E7" in unencrypted form to the server 30, 40 associated with the interface device 20, or it may be encrypted or filtered E6a" before being sent E7" to the server 30, 40 associated with the interface device 20.

Figure 5:
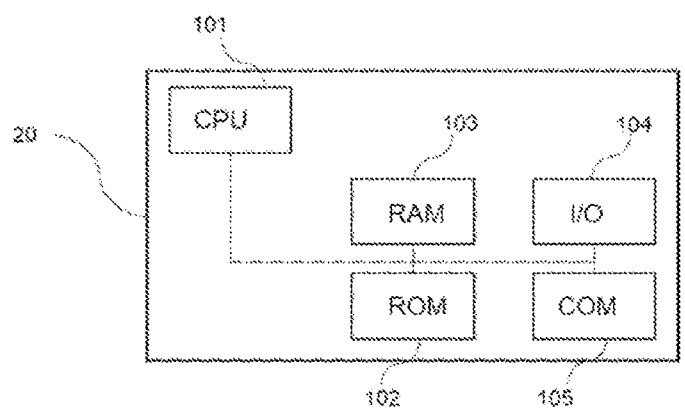
FIG. 5 illustrates a hardware architecture able to implement the processing method according to the invention.

FIG. 5 schematically illustrates a hardware architecture of an interface device 20 able to implement the processing method according to the invention.

The interface device 20 comprises a communication bus 100 to which the following are connected:
- a processing unit 101, called CPU (for "central processing unit") in the figure and possibly comprising one or more processors;
- a non-volatile memory 102, for example a ROM (for "read-only memory"), an EEPROM (for "electrically erasable programmable read-only memory") or a flash memory;
- a random access memory 103 or RAM;
- an input/output interface 104, called I/O in the figure, for example keys or buttons, a screen, a keypad, a mouse or another pointing device such as a touchscreen or a remote controller allowing a user to interact with an interface device 20 via a graphical interface or a human-machine interface; and
- a communication interface 105, called COM in the figure, designed to exchange data for example with a server via a network 200.

The random access memory 103 contains registers designed to record variables and parameters that are created and modified during the execution of a computer program comprising instructions for implementing the processing method according to the invention. The instruction codes of the program stored in the non-volatile memory 102 are loaded into the RAM memory 103 in order to be executed by the processing unit CPU 101.

The non-volatile memory 102 is for example a rewritable EEPROM memory or flash memory able to constitute a medium within the meaning of the invention, that is to say able to comprise a computer program comprising instructions for implementing the processing method according to the invention. The rewritable memory may furthermore contain what is termed a list of authorized servers (whitelist of servers) and/or what is termed a list of unauthorized servers (blacklist of servers).

This program, by way of its instructions, defines functional modules of the interface device 20 that are implemented and/or control the hardware elements described above. These modules comprise in particular the following modules for processing requests sent by the user terminal 10:
- a reception module configured so as to receive a request RR received from the user terminal 10;
- a detection module configured so as to detect whether the received request RR is intended to be transmitted to a server 50 not authorized by the communication network 200 access provider; and
- a transmission module configured so as to transmit, to a resolution server 30 associated with the interface device 20, a second request RR2 received by said reception module, the second request RR2 being intended to be sent to said resolution server 30 associated with the interface device 20.

The interface device 20 may furthermore comprise, according to some embodiments:
- a determination module for determining, based on the received request, a network address representative of the server to which the request is destined; and
- a checking module for determining whether the determined address corresponds to an unauthorized server;
- a second determination module for determining, based on the received request, a port of the interface device designated for sending the received request,
- a generation module for generating an encrypted test request intended to be sent to the server corresponding to the determined network address;
- a sending module for sending a request to the determined port;
- an identification module for identifying a server as being an unauthorized server;
- a blocking module for blocking the transmission of the requests, in particular the request received from the user terminal;
- a configuration module for configuring the user terminal such that the requests, in particular the generated second request, is intended to be transmitted to the server associated with the interface device; and
- a generation module for generating an error message destined for the user terminal, informing it of the detection of a request intended to be transmitted to a server not authorized by the Internet access provider.

According to some embodiments, the interface device 20 may comprise a filtering and/or encryption module for generating requests based on the requests received from the user terminal 10.

The abovementioned modules and means are driven by the processor of the processing unit 101. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

The user terminal 10 also comprises a communication bus to which there are connected a processing unit or microprocessor, a non-volatile memory, a random access memory or RAM, and a communication interface designed in particular to exchange data with the interface device 20.

Figure 6:
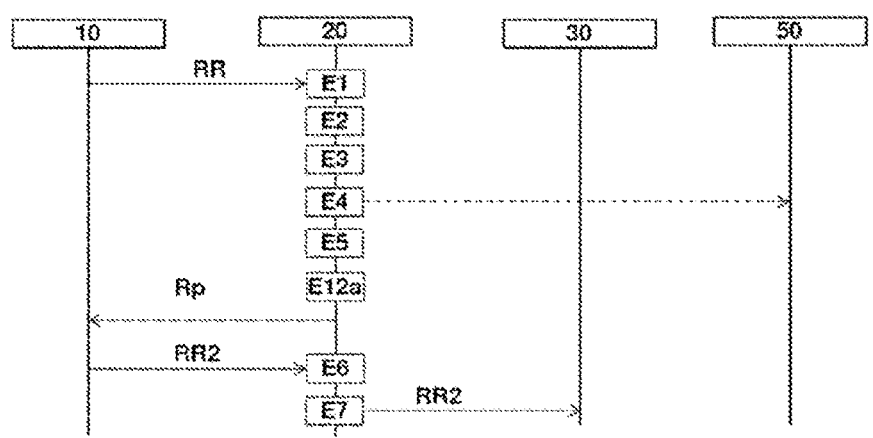
FIG. 6 illustrates exchanges between entities of the system according to one embodiment of the invention.

FIG. 6 illustrates one example of exchanges between the user terminal 10, the interface device 20 and servers 30, 40, 50 of the communication network 200 when the processing method is implemented according to the embodiment shown in FIG. 1.

The user terminal 10 addresses a resolution request RR to the interface device 20. This request is for example generated in accordance with the DoH protocol and is intended to be addressed to the network address (IP address) 8.8.8.8 to port 443 (for security). By way of completely non-limiting example, this request may take the following form:

"POST/dns-query HTTP/2
Host: dns.google
Accept: */*
Content-Type: application/dns-message
Content-Length: 31"

When the request is received E1 by the interface device 20, port 443 is determined E2. For this purpose, the destination port for the request is extracted. Since the determined port is a port for establishing a secure connection, the network address is determined E4, that is to say that it is identified and extracted from the request. It should be noted that the network address is introduced into the IP header transmitting the request.

According to one embodiment, the interface device 20 checks whether the address belongs to a blacklist of servers. In this example, the network address is listed in the blacklist. The interface device therefore blocks E12a the sending of the request.

Next, the user terminal 10 generates a second request RR2 and addresses it to the interface device 20. When the interface device 20 receives E6 the second request RR2, it transmits it E7 to the server 30 associated with the interface device 20.

This example is described by way of illustration and without any limitation. Of course, according to various embodiments, the exchanges between the entities forming the system and described above are different.

Although the present disclosure has been described with reference to one or more examples, workers skilled in the art will recognize that changes may be made in form and detail without departing from the scope of the disclosure and/or the appended claims.

The invention claimed is:

1. A processing method for processing requests sent by a user terminal, said processing method being implemented by an interface device allowing the user terminal to access a communication network, said processing method comprising:
    detecting that a received first request is intended to be transmitted to an unauthorized server not authorized by said interface device; and
    said detecting triggering the following steps of:
        configuring the user terminal such that a second request is intended to be transmitted by the user terminal to a resolution server associated with the interface device from among a set of resolution servers associated with the interface device;
        receiving said second request from the user terminal; and
        transmitting, to said resolution server associated with said interface device, said received second request or a third request generated by the interface device based on said received second request.

2. The method as claimed in claim 1, wherein the unauthorized server is a server different from the set of resolution servers associated with said interface device and/or a server forming part of what is termed a list of servers not authorized by the access provider providing access to said communication network.

3. The processing method as claimed in claim 1, wherein the detecting comprises:
    determining, based on the received first request, a network address representative of the server to which the first request is destined; and
    checking the determined network address in order to determine whether the determined network address corresponds to a server not authorized by the interface device.

4. The processing method as claimed in claim 1, wherein the detecting comprises:
    determining, based on the first request received from a port of the interface device designated for the destination of said received request, whether said determined port corresponds to a port for establishing a secure connection;
    determining, based on the received first request, a network address representative of the server to which the first request is destined, and
    checking said determined network address in order to determine whether the determined network address corresponds to a server not authorized by the interface device.

5. The processing method as claimed in claim 4, further comprising, in response to said determined port corresponding to a port for establishing a secure connection and the result of the checking of said network address being that said address does not correspond to a server associated with the interface device or to a network address of a server in the list of unauthorized servers:
    generating an encrypted test request intended to be sent to the server corresponding to the determined network address;
    sending said test request to said determined port; and
    if the interface device receives a response to the test request from the server, identifying said server as being an unauthorized server.

6. The processing method as claimed in claim 1, further comprising:
    receiving, from the user terminal, the first request, which is an unencrypted resolution request comprising a predefined character string; and
    sending, to the user terminal, a response representative of an error telling the user terminal not to generate encrypted requests,
    receiving the second request intended to be sent to a server associated with the interface device following the sending of said response representative of an error.

7. The processing method as claimed in claim 1, further comprising, in response to said received first request being detected as being intended to be transmitted to a server not authorized by the interface device, blocking transmission of said received first request, said receiving the second request being implemented following implementation of said blocking of the transmission of said received first request.

8. The processing method as claimed in claim 1, further comprising, in response to said received first request being detected as being intended to be transmitted to a server not authorized by the interface device, generating an error message destined for the user terminal, informing said user terminal of the detection of the first request being intended to be transmitted to a server not authorized by an Internet access provider of the interface device.

9. The processing method as claimed in claim 1, wherein said second request is encrypted by the user device.

10. The processing method as claimed in claim 1, wherein the third request generated based on said second request is destined for a resolution server from among a predefined subgroup of servers associated with the interface device or corresponds to the second request) encrypted.

11. An interface device allowing a user terminal to access a communication network, said interface device comprising:
  a processor; and
  a non-transitory computer readable medium comprising instructions stored thereon which when executed by the processor configure the interface device to process requests sent by said user terminal by:
    receiving a received first request;
    detecting whether the received first request is intended to be transmitted to an unauthorized server not authorized by the interface device; and
    said detecting triggering the following steps of:
      configuring the user terminal such that a second request is intended to be transmitted by the user terminal to a resolution server associated with the interface device from among a set of resolution servers associated with the interface device;
      receiving said second request from the user terminal; and
      transmitting, to the resolution server associated with said interface device, the second request or a third request generated based on the second request by the interface device.

12. A request processing system comprising the user terminal configured so as to access the communication network and the interface device as claimed in claim 11 allowing said user terminal to access said communication network.

13. A non-transitory computer-readable information medium on which there is recorded a computer program comprising a sequence of instructions for implementing a processing method for processing requests sent by a user terminal, when the computer program is loaded into and executed by a processor of an interface device, the interface device allowing the user terminal to access a communication network, said processing method comprising:
  detecting that a received first request is intended to be transmitted to an unauthorized server not authorized by said interface device; and
  said detecting triggering the following steps of:
    configuring the user terminal such that a second request is intended to be transmitted by the user terminal to a resolution server associated with the interface device from among a set of resolution servers associated with the interface device;
    receiving said second request from the user terminal; and
    transmitting, to said resolution server associated with said interface device, said received second request or a third request generated by the interface device based on said received second request.

* * * * *